(12) United States Patent
Zhang

(10) Patent No.: US 10,841,029 B2
(45) Date of Patent: Nov. 17, 2020

(54) HYBRID TIME-DIVISION MULTIPLEXING

(71) Applicant: WUHAN SYNTEK LTD., Wuhan (CN)

(72) Inventor: Kefeng Zhang, Wuhan (CN)

(73) Assignee: WUHAN SYNTEK LTD., Wuhan (CN)

( * ) Notice: Subject to any disclaimer, the term of this patent is extended or adjusted under 35 U.S.C. 154(b) by 17 days.

(21) Appl. No.: 16/377,313

(22) Filed: Apr. 8, 2019

(65) Prior Publication Data
US 2019/0238246 A1    Aug. 1, 2019

Related U.S. Application Data

(63) Continuation of application No. PCT/CN2016/101601, filed on Oct. 9, 2016.

(51) Int. Cl.
*H04J 3/00*  (2006.01)
*H04W 74/04* (2009.01)
(Continued)

(52) U.S. Cl.
CPC ............... *H04J 1/06* (2013.01); *H04L 29/06* (2013.01); *H04W 56/001* (2013.01); *H04W 80/02* (2013.01)

(58) Field of Classification Search
None
See application file for complete search history.

(56) References Cited

U.S. PATENT DOCUMENTS

| 5,570,355 A | 10/1996 | Dail et al. |
| 6,404,779 B1 | 6/2002 | Silvers |

(Continued)

FOREIGN PATENT DOCUMENTS

| CN | 1151094 A | 6/1997 |
| CN | 1524396 A | 8/2004 |

(Continued)

OTHER PUBLICATIONS

International Search Report of PCT/CN2016/101601.

Primary Examiner — Scott M Sciacca
(74) Attorney, Agent, or Firm — Andrew C. Cheng

(57) ABSTRACT

A hybrid time-division multiplexing comprises: S1, determining a length of a single time cycle; S2, formulating a working state table corresponding to the length of the single time cycle; S3, dividing the single time cycle into a synchronous time-division multiplexing time section and/or a statistical time-division multiplexing time section with a ratio of the synchronous time-division multiplexing time section to the single time cycle no less than 0 and no greater than 1; and S4, according to the working state table, accessing the channel and transmitting information by the MAC protocol user adopting synchronous time-division multiplexing in the synchronous time-division multiplexing time section, and/or accessing the channel and transmitting information by the MAC protocol user adopting statistical time-division multiplexing in the statistical time-division multiplexing time section. The method realizes compatibility of the above two communication methods on one chip, and satisfies user's requirements on real-time communication and a high channel utilization rate.

7 Claims, 6 Drawing Sheets

(51) Int. Cl.
*H04W 74/08* (2009.01)
*H04J 1/06* (2006.01)
*H04W 56/00* (2009.01)
*H04L 29/06* (2006.01)
*H04W 80/02* (2009.01)

(56) References Cited

U.S. PATENT DOCUMENTS

| | | | |
|---|---|---|---|
| 2005/0135284 A1* | 6/2005 | Nanda | H04L 29/06 370/294 |
| 2007/0263635 A1* | 11/2007 | Garg | H04L 47/14 370/395.4 |
| 2015/0016309 A1* | 1/2015 | Fang | H04J 11/0023 370/277 |
| 2016/0044711 A1* | 2/2016 | Lou | H04B 7/0695 370/338 |

FOREIGN PATENT DOCUMENTS

| | | |
|---|---|---|
| CN | 101814945 A | 8/2010 |
| CN | 103582139 A | 2/2014 |
| WO | 03055113 A1 | 7/2003 |

\* cited by examiner

| | CH1 | CH2 | CH3 | CH4 |
|---|---|---|---|---|
| X\Y | Ttd1 | Ttd2 | Ttd3 | Tstd |
| f1 | CH11 | CH21 | CH31 | CH41 |
| f2 | CH12 | CH22 | CH32 | CH42 |
| ⋮ | ⋮ | ⋮ | ⋮ | ⋮ |
| fm | CH1m | CH2m | CH3m | CH4m |

HYBRID TIME-DIVISION MULTIPLEXING

FIELD OF THE INVENTION

The present disclosure relates to the field of wireless communication, and more particularly relates to a hybrid time-division multiplexing.

BACKGROUND OF THE INVENTION

At present, the wireless communication chip for mobile network generally adopts synchronous time-division multiplexing (TDM) or statistical time-division multiplexing (STDM).

The TDM allocates a definite channel for each user through a control center. The sequence for all the users to use the channel is definite without conflict. If a certain channel is allocated to a certain user, this channel cannot be used by other user no matter whether there is any information to be transmitted in this channel.

The characteristics of TDM include: 1) the time for the user to use the channel is determined by the control center; 2) the time for communicating and the time for waiting are known; 3) there is a sequence without conflict; 4) the transmitting speed is fixed; 5) it is suitable for real-time communication. The advantages of TDM are: fixed length in time slots, convenient for control, and suitable for digital information transmission; and its disadvantage is: low usage rate of the channel and device. TDM is widely used in the field with high requirement on real-time capability such as telegraph and telephone networks, Internet of things and so on.

STDM is an asynchronous time-division multiplexing. When a user needs to transmit data, the user can directly scramble for the channel, and transmitting capability of the channel can be used by other users if the user suspends. The characteristics of STDM include: 1) there is no control center and those who get are in power; 2) the time for communicating and the time for waiting are unknown; 3) there is no fixed sequence; 4) the transmitting speed is not uniform and can be as high as the total transmitting capability of the channel; 5) it is suitable for non-real-time communication. The advantage of STDM is: usage rate of the channel and device is improved; and the disadvantage of STDM is: technology is very complex (a memory is need for storing buffered data of input queuing information, and complicate addressing and controlling technology are needed). STDM is mainly applied in IP Internet with low requirement on real-time capability.

It is not hard to see that TDM and STDM both have their own characteristics and their application fields are also not the same due to their own advantages. However, it is always a technical problem in the field that these two multiplexing can't coexistent in a single chip. In other words, the existing time-division multiplexing for wireless communicating chips can't meet user's requirements both on real-time capability and high usage rate of channel in communication.

The technical problem exists in the prior art that TDM is not compatible with STDM in a single wireless communicating chip, and hence the wireless communicating chip can't meet user's requirements both on real-time capability and high usage rate of channel in communication.

SUMMARY OF THE INVENTION

The objective of the present disclosure is to provide hybrid time-division multiplexing, to solve the technical problem exists in the prior art that TDM is not compatible with STDM in a single wireless communicating chip, and hence the wireless communicating chip can't meet user's requirements both on real-time capability and high usage rate of channel in communication. The present disclosure realizes the technical effects that TDM is compatible with STDM in a single wireless communicating chip, and hence the wireless communicating chip can meet user's requirements both on real-time capability and high usage rate of channel in communication.

The present disclosure provides a hybrid time-division multiplexing, comprising: determining a length of a single time cycle according to preset communication requirements; formulating a working state table corresponding to the length of the single time cycle for the hybrid time-division multiplexing; dividing the single time cycle into a synchronous time-division multiplexing time section and/or a statistical time-division multiplexing time section based on the working state table; wherein the synchronous time-division multiplexing time section is allocated to a MAC protocol user adopting synchronous time-division multiplexing to access a channel, and the statistical time-division multiplexing time section is allocated to a MAC protocol user adopting statistical time-division multiplexing to access the channel; and a ratio of the synchronous time-division multiplexing time section to the single time cycle is no less than 0 and no greater than 1; and according to the working state table, accessing the channel and transmitting information by the MAC protocol user adopting synchronous time-division multiplexing in the synchronous time-division multiplexing time section, and/or accessing the channel and transmitting information by the MAC protocol user adopting statistical time-division multiplexing in the statistical time-division multiplexing time section.

Optionally, the hybrid time-division multiplexing further comprises: if the ratio of the synchronous time-division multiplexing time section to the single time cycle is greater than 0 and no greater than 1, dividing the synchronous time-division multiplexing time section into a plurality of synchronous time-division multiplexing time subsections based on the working state table to build a one-to-one correspondence between a plurality of MAC protocol users adopting synchronous time-division multiplexing and the plurality of synchronous time-division multiplexing time subsections with each user accessing to the channel and transmitting information in its own time subsection.

Optionally, a length of each synchronous time-division multiplexing time subsection is determined according to information quantity to be transmitted by the corresponding MAC protocol user.

Optionally, the plurality of synchronous time-division multiplexing time subsections correspond one to one with a plurality of channels respectively.

Optionally, a state machine model is used to switch among working states of the plurality of synchronous time-division multiplexing time subsections.

Optionally, a state machine model is used to switch among working states of synchronous time-division multiplexing time sections and statistical time-division multiplexing time sections.

Optionally, the hybrid time-division multiplexing further comprises: if the ratio of the synchronous time-division multiplexing time section to the single time cycle is no less than 0 and smaller than 1, a channel accessing state of a MAC protocol user is determined by an actual channel accessing situation of the user in the statistical time-division multiplexing time section.

Optionally, a channel accessing mechanism of the MAC protocol user adopting the statistical time-division multiplexing comprises: collision avoidance and collision detection.

Optionally, an information transmitting mode of the MAC protocol user adopting the synchronous time-division multiplexing or the statistical time-division multiplexing is simplex, half duplex or duplex.

Optionally, the synchronous time-division multiplexing time section and/or the statistical time-division multiplexing time section correspond to a plurality of channels with different frequency ranges.

The one or more technical solutions disclosed in the present disclosure at least have the following technical effects or advantages:

In the present disclosure, the hybrid time-division multiplexing comprises: first, determining a length of a single time cycle according to preset communication requirements; formulating a working state table corresponding to the length of the single time cycle for the hybrid time-division multiplexing; then, dividing the single time cycle into a synchronous time-division multiplexing time section and/or a statistical time-division multiplexing time section based on the working state table; wherein the synchronous time-division multiplexing time section is allocated to a MAC protocol user adopting synchronous time-division multiplexing to access a channel, and the statistical time-division multiplexing time section is allocated to a MAC protocol user adopting statistical time-division multiplexing to access the channel; and a ratio of the synchronous time-division multiplexing time section to the single time cycle is no less than 0 and no greater than 1; and according to the working state table, accessing the channel and transmitting information by the MAC protocol user adopting synchronous time-division multiplexing in the synchronous time-division multiplexing time section, and/or accessing the channel and transmitting information by the MAC protocol user adopting statistical time-division multiplexing in the statistical time-division multiplexing time section. That is to say, the time cycle can be freely configured and the working state table corresponding to the length of the single time cycle for the hybrid time-division multiplexing can be formulated according to user's communication requirements. Further, ratios of the synchronous time-division multiplexing time section and the statistical time-division multiplexing time section in each time cycle can be freely configured according to the working state table to realize that the MAC protocol user adopting synchronous time-division multiplexing can access the channel and transmit information in the synchronous time-division multiplexing time section, and/or the MAC protocol user adopting statistical time-division multiplexing can access the channel and transmit information in the statistical time-division multiplexing time section. The present disclosure effectively solves the technical problem in the prior art that the TDM and STDM are not compatible with each other in one wireless communication chip which hence cannot satisfy user's requirements on real-time communication and high channel utilization rate. The present disclosure realizes compatibility of the above two communication methods TDM and STDM on one wireless communication chip, and satisfies user's requirements on real-time communication and a high channel utilization rate.

BRIEF DESCRIPTION OF THE DRAWINGS

In order to make the technical solutions in the disclosure or in the prior art described more clearly, the drawings associated to the description of the embodiments or the prior art will be illustrated concisely hereinafter. Obviously, the drawings described below are only some embodiments according to the disclosure. Numerous drawings therein will be apparent to one of ordinary skill in the art based on the drawings described in the disclosure without creative efforts.

DETAILED DESCRIPTION OF THE PREFERRED EMBODIMENT

Figure 1:
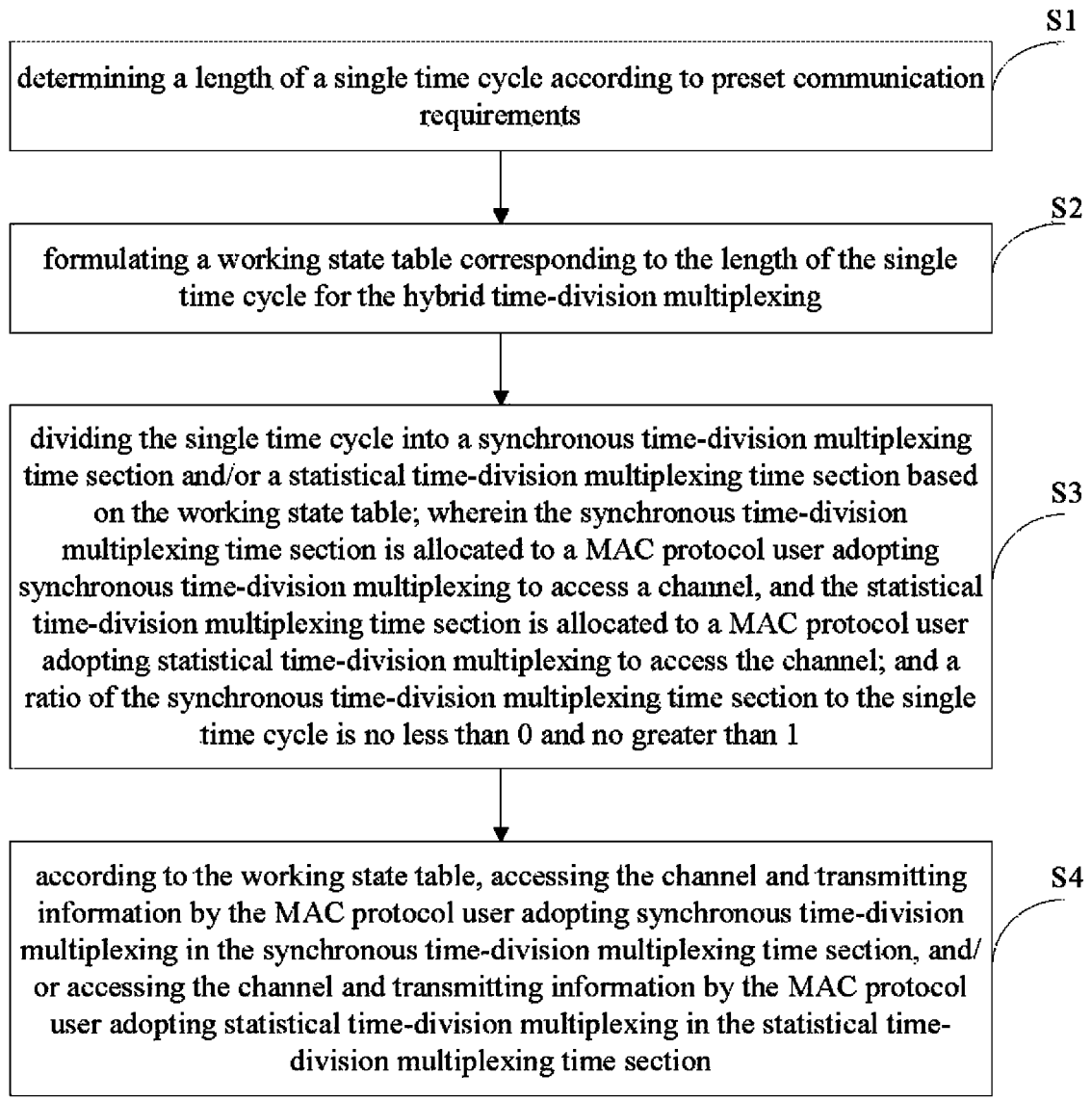
FIG. 1 is a flow chat of a hybrid time-division multiplexing according to an embodiment of the present disclosure.
Figure 2A:
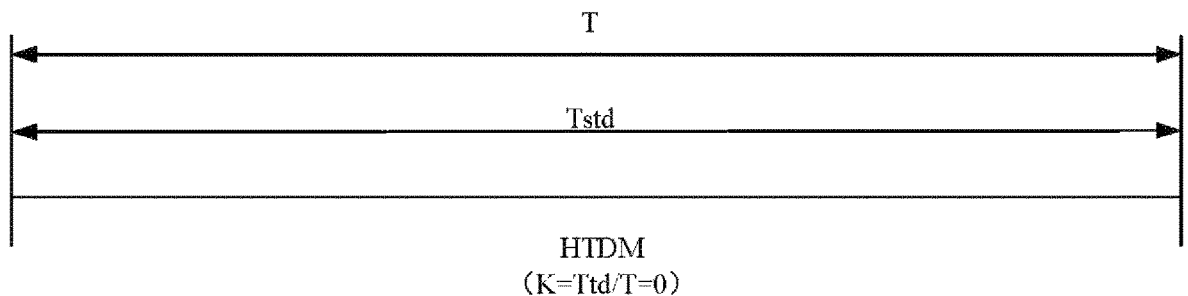
FIG. 2A is a schematic view showing a ratio of a synchronous time-division multiplexing time section to a single time cycle being 0 according to an embodiment of the present disclosure.
Figure 2B:
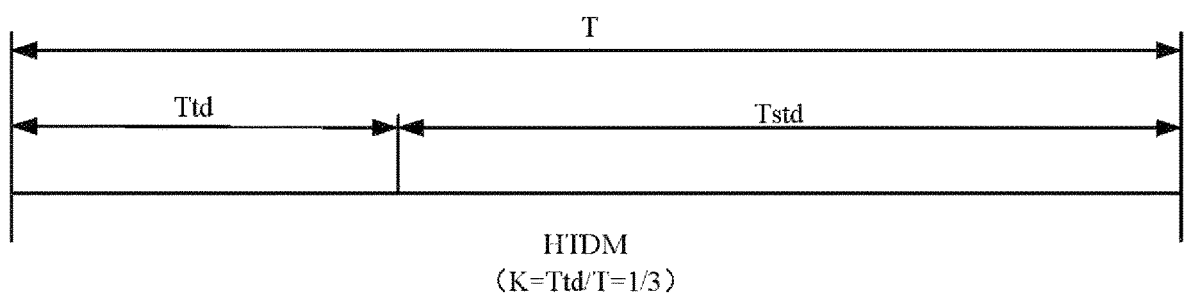
FIG. 2B is a schematic view showing the ratio of the synchronous time-division multiplexing time section to the single time cycle being ⅓ according to an embodiment of the present disclosure.
Figure 2C:
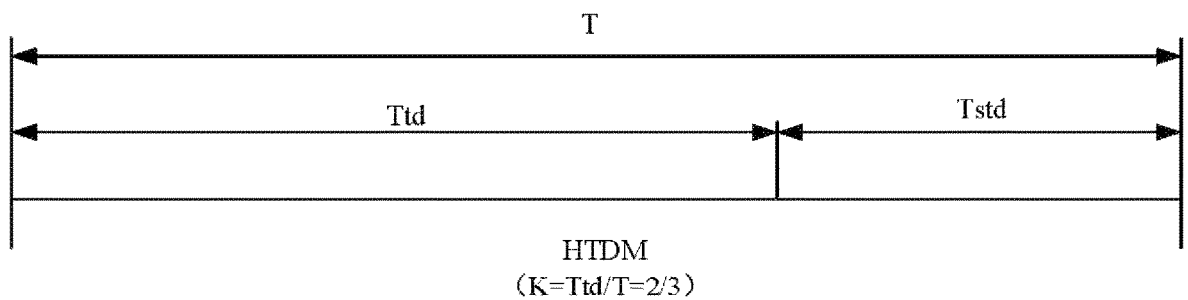
FIG. 2C is a schematic view showing the ratio of the synchronous time-division multiplexing time section to the single time cycle being ⅔ according to an embodiment of the present disclosure.
Figure 2D:
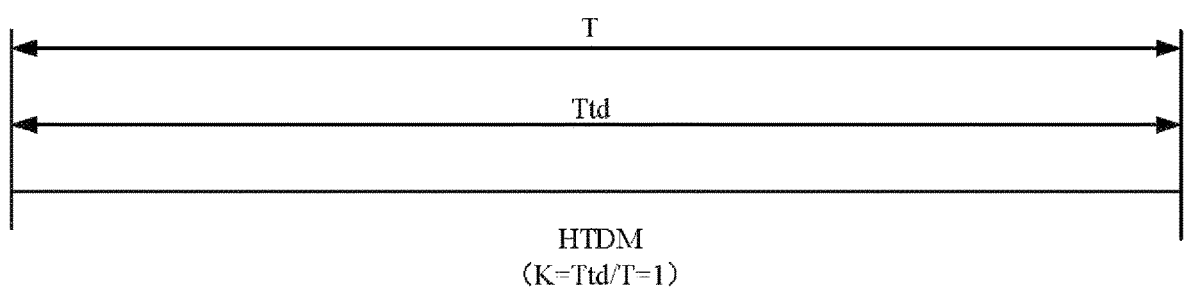
FIG. 2D is a schematic view showing the ratio of the synchronous time-division multiplexing time section to the single time cycle being 1 according to an embodiment of the present disclosure.

The embodiment of the present disclosure provides a hybrid time-division multiplexing to solve the technical problem in the prior art that the two methods of TDM and STDM are not compatible with each other in one wireless communication chip and hence cannot satisfy user's requirements on real-time communication and high channel utilization rate, realizes compatibility of the above two communication methods on one wireless communication chip, and satisfies user's requirements on real-time communication and a high channel utilization rate.

A general concept of the technical solutions in the present embodiment to solve the above technical problem is as follows:

The embodiment of the present disclosure provides a hybrid time-division multiplexing, comprising: determining a length of a single time cycle according to preset communication requirements; formulating a working state table corresponding to the length of the single time cycle for the hybrid time-division multiplexing; dividing the single time cycle into a synchronous time-division multiplexing time section and/or a statistical time-division multiplexing time section based on the working state table; wherein the synchronous time-division multiplexing time section is allocated to a MAC protocol user adopting synchronous time-division multiplexing to access a channel, and the statistical time-division multiplexing time section is allocated to a MAC protocol user adopting statistical time-division multiplexing to access the channel; and a ratio of the synchronous time-division multiplexing time section to the single time cycle is no less than 0 and no greater than 1; and according to the working state table, accessing the channel and transmitting information by the MAC protocol user adopting synchronous time-division multiplexing in the synchronous time-division multiplexing time section, and/or accessing the channel and transmitting information by the MAC protocol user adopting statistical time-division multiplexing in the statistical time-division multiplexing time section.

It can be seen that the time cycle can be freely configured and the working state table corresponding to the length of the single time cycle for the hybrid time-division multiplexing can be formulated according to user's communication requirements. Further, ratios of the synchronous time-division multiplexing time section and the statistical time-division multiplexing time section in each time cycle can be freely configured according to the working state table to realize that the MAC protocol user adopting synchronous time-division multiplexing can access the channel and transmit information in the synchronous time-division multiplexing time section, and/or the MAC protocol user adopting statistical time-division multiplexing can access the channel and transmit information in the statistical time-division multiplexing time section. The present disclosure effectively solves the technical problem in the prior art that the TDM and STDM are not compatible with each other in one wireless communication chip which hence cannot satisfy user's requirements on real-time communication and high channel utilization rate. The present disclosure realizes compatibility of the above two communication methods TDM and STDM on one wireless communication chip, and satisfies user's requirements on real-time communication and a high channel utilization rate.

For the purpose of better understanding to above technical solution, the present disclosure will be further described in detail with reference to the accompanying drawings and embodiments below. It should be understood that embodiments described here are only for explaining the present disclosure and the disclosure, however, should not be constructed as limited to the embodiment as set forth herein. Embodiments and technical features in embodiments are be combined together without conflict.

Embodiment One

Referring to FIG. 1 and FIG. 2A to FIG. 2D, the present embodiments discloses a hybrid time-division multiplexing (HTDM), and the process of this method comprises:

S1, determining a length T of a single time cycle according to preset communication requirements;

S2, formulating a working state table corresponding to the length T of the single time cycle for the HTDM;

S3, dividing the single time cycle into a synchronous time-division multiplexing time section Ttd and/or a statistical time-division multiplexing time section Tstd based on the working state table; wherein the synchronous time-division multiplexing time section Ttd is allocated to a MAC protocol user adopting synchronous time-division multiplexing (TDM) to access a channel, and the statistical time-division multiplexing time section Tstd is allocated to a MAC protocol user adopting statistical time-division multiplexing (STDM) to access the channel; and a ratio K of the synchronous time-division multiplexing time section Ttd to the single time cycle T is no less than 0 and no greater than 1; and S4, according to the working state table, accessing the channel and transmitting information by the MAC protocol user adopting TDM in the synchronous time-division multiplexing time section Ttd, and/or accessing the channel and transmitting information by the MAC protocol user adopting STDM in the statistical time-division multiplexing time section Tstd.

Specifically, a router may arranged in the communication chip as a master of the control center, and the master of the control center is connected to MAC protocol users including the MAC protocol users adopting TDM and the MAC protocol users adopting the STDM. The master of the control center is capable of estimating the length of data frame to be transmitted by the MAC protocol users connected to the master and determining the length T of one single time cycle according to the length of data frame obtained. Further, the master of the control center is configured to formulate the working state table corresponding to the length T of the single time cycle for the HTDM according to the length T of the single time cycle and the length of the date frame to be transmitted by the MAC protocol users adopting TDM. State information included in the working state table is as shown in table 1 in the following.

TABLE 1 a working state table for HTDM

| Length of a single time cycle | TDM time section | STDM time section | Ratio of TDM time section |
| --- | --- | --- | --- |
| T | Ttd | Tstd = T − Ttd | K = Ttd/T |

It is noted that only a part of the parameters are listed in table 1. A complete working state table can be formed by configuring corresponding parameters. The ratio of the TDM time section Ttd to the single time cycle T (K=Ttd/T) is adjustable between 0-1. As shown in FIG. 2A to FIG. 2D, the ratio relationship between the TDM time section Ttd and the single time cycle T is shown by taking K=0, ⅓, ⅔ and 1 as examples.

Further, in the specific implementation, the number of the MAC protocol user adopting the TDM may be several. In this case, the state information included in the working state table is as shown in table 2 below, which further includes information of the MAC protocol user adopting TDM based on table 1.

TABLE 2 another working state table for HTDM

| Length of a single time cycle | TDM time section | STDM time section | Ratio of TDM time section | Information of the MAC protocol user adopting |
|---|---|---|---|---|
| T | Ttd | Tstd = T − Ttd | K = Ttd/T | TDM |

The information of the MAC protocol user adopting TDM may include the number of the MAC protocol users adopting TDM, name of each MAC protocol user adopting TDM, protocol type of each MAC protocol user adopting TDM, length of data frame to be transmitted by each MAC protocol user adopting TDM, length of frame label to be transmitted under each protocol type of the MAC protocol user adopting TDM. Similar to table 1, only a part of the parameters are listed in table 2. A complete working state table can be formed by configuring corresponding parameters.

Figure 3:
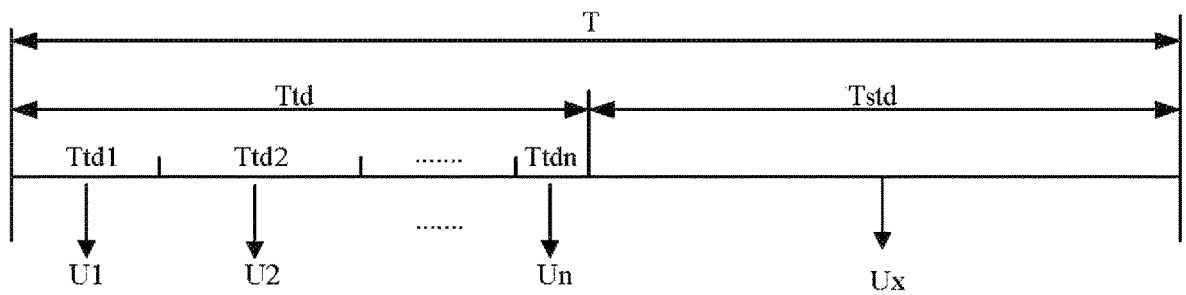
FIG. 3 is a schematic view showing a correspondence between MAC protocol users and the single time cycle divided into a plurality of synchronous time-division multiplexing time sections and one statistical time-division multiplexing time section according to an embodiment of the present disclosure.

If the ratio of the synchronous time-division multiplexing time section Ttd to the single time cycle T is greater than 0 and no greater than 1, the synchronous time-division multiplexing time section Ttd may be divided into a plurality of synchronous time-division multiplexing time subsections based on the working state corresponding to table 2 to build a one-to-one correspondence between a plurality of MAC protocol users adopting TDM and the plurality of synchronous time-division multiplexing time subsections with each user accessing to a channel and transmitting information in its own time subsection; wherein the channels are one-to-one correspondence to the plurality of synchronous time-division multiplexing time subsections. As shown in FIG. 3, the number of the MAC protocol users adopting TDM is n, an integer greater than 1. Accordingly, the synchronous time-division multiplexing time section Ttd is divided into n synchronous time-division multiplexing time subsections Ttd1 to Ttdn, which are one-to-one correspondence to n MAC protocol users (U1-Un) adopting TDM. In the specific implementation, one MAC protocol user adopting TDM may correspond to a plurality of synchronous time-division multiplexing time subsections, which is not limited here. Further, lengths of the synchronous time-division multiplexing time subsections are determined according to the length of data frame to be transmitted by corresponding MAC protocol user.

Taking one MAC protocol user adopting the TDM corresponding to one protocol type as an example, protocol types of any two MAC protocol users in the n MAC protocol users (U1-Un) adopting TDM may be the same or may be different. For example, the protocol type of the user U1 is TD-SCDMA, the protocol type of the user U2 is WCDMA, the protocol type of the user U3 is 802.16, . . . , and the protocol type of the user Un is TD-SCDMA and so on.

Regarding the statistical time-division multiplexing time section Tstd, the user accessing mechanism in this time section cannot be agreed in advance. Only when the user finishes using the channel, the information can be known, such as the name of the user accessing the channel, accessing time length and so on. As shown in FIG. 3, the MAC protocol user corresponding to the statistical time-division multiplexing time section Tstd is defined as Ux.

Figure 4:
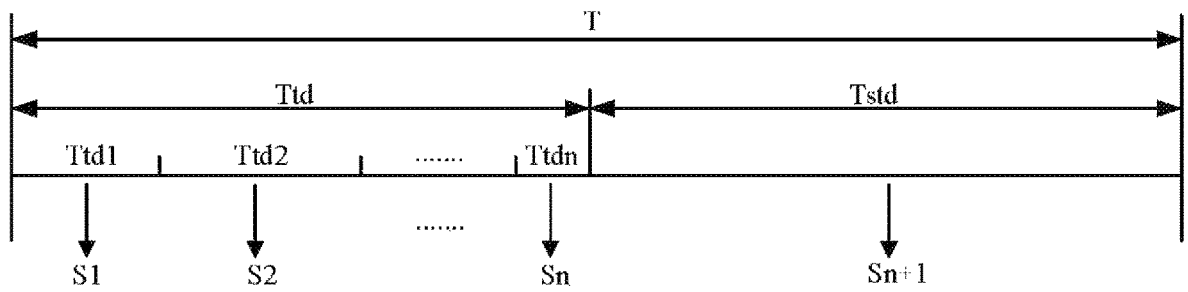
FIG. 4 is a schematic view showing a correspondence among working states and the single time cycle divided into a plurality of synchronous time-division multiplexing time sections and one statistical time-division multiplexing time section according to an embodiment of the present disclosure.

In the specific implementation, a state machine model is used in the HTDM to switch among working states of the plurality of synchronous time-division multiplexing time subsections Ttd1 to Ttdn. The state machine model is further used to switch among working states of the synchronous time-division multiplexing time section Ttd and the statistical time-division multiplexing time section Tstd. Specifically, as shown in FIG. 4, the single time cycle T is divided into the synchronous time-division multiplexing time section Ttd and the statistical time-division multiplexing time section Tstd, and the synchronous time-division multiplexing time section is further divided into n synchronous time-division multiplexing time subsections Ttd1 to Ttdn, which correspond one to one with n+1 states S1 to Sn+1. The states S1 to Sn correspond one to one with the n synchronous time-division multiplexing time subsections Ttd1 to Ttdn, and the state Sn+1 corresponds to the statistical time-division multiplexing time section Tstd.

It can be known from above content that working states of the state machine correspond to time sections divided in the single time cycle. In the specific implementation, a counter and a state machine controller may further defined within the communication chip. By building a correspondence between the time sections (i.e. working states) and count values of the counter, the counter may send an interrupt request to the state machine controller at a special time during value increasing or value decreasing process of the counter so as to switch among the working states.

Figure 5:
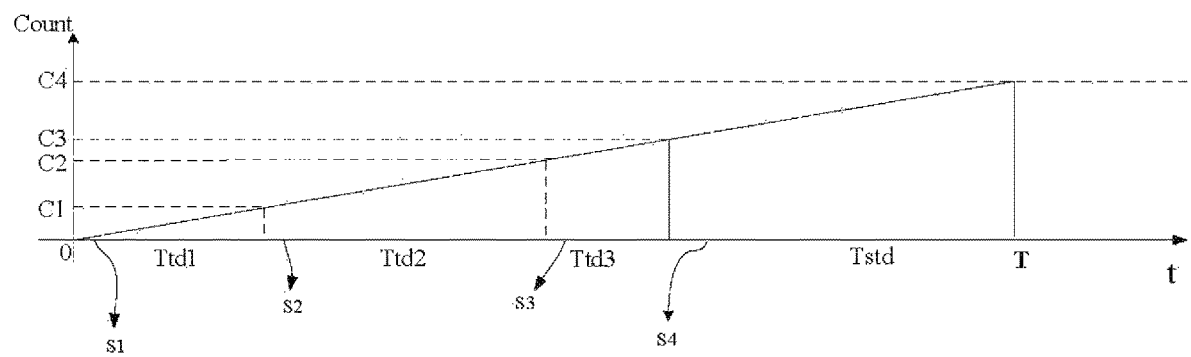
FIG. 5 is a schematic view showing a correspondence between count values of a state machine counter and channel accessing time sections in 2D coordinates according to an embodiment of the present disclosure.

Referring to FIG. 5, FIG. 5 is a schematic view showing the correspondence between the count values of the counter and channel accessing time sections t in 2D coordinates. Providing the count values of the counter increase gradually and the synchronous time-division multiplexing time section Ttd is divided into 3 synchronous time-division multiplexing time subsections Ttd1 to Ttd3, the state machine comprises four working states S1-S4:

When Count is no less than 0 and less than C1, the state machine works in time section Ttd1 which corresponds to working state S1;

When Count is no less than C1 and less than C2, the state machine works in time section Ttd2 which corresponds to working state S2;

When Count is no less than C2 and less than C3, the state machine works in time section Ttd3 which corresponds to working state S3;

When Count is no less than C3 and less than C4, the state machine works in time section Tstd which corresponds to working state S4.

The time sections Ttd1-Ttd3 together constitute the synchronous time-division multiplexing time section Ttd. The counter sends a first interrupt request to the state machine controller when the count value Count=0 (i.e. when it start to count) to enter into the state S1; the counter sends a second interrupt request to the state machine controller when the count value Count=C1 to the state machine controller to enter into the state S2; the counter sends a third interrupt request to the state machine controller when the count value Count=C2 to the state machine controller to enter into the state S3; the counter sends a fourth interrupt request to the state machine controller when the count value Count=C3 to the state machine controller to enter into the state S4; and the counter sends a fifth interrupt request to the state machine controller when the count value Count=C4 to the state machine controller to indicate the completeness of the work in a time cycle, and the counter will be reset to be zero for next new time cycle.

In specific implementation, the state machine can be realized in combination with a linked list. The linked list is a common and important data structure which allocates storage dynamically. It is capable of opening memory unit according to requirements. The linked list has a "head pointer" variable, and it stores an address. This address points to an element. Each element in the linked list is called a "node". Each node includes two parts: one is the actual data to be used by the user, and the other is an address of the next node. Therefore, the "head pointer" points to a first element, the first element points to a second element, . . . , until the last element, the last element does not point to any other element, and the last element is called "list end". "NULL" (blank address) is stored in the address part of the last element. The linked list is ended at the last element. It is noted that the last element may point to the first element according to specific application requirements, to form a circulated working mode.

Figure 6:
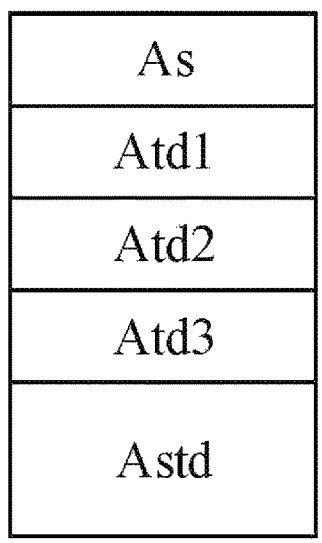
FIG. 6 is a structural schematic view of linked list when the single time cycle is divided into three synchronous time-division multiplexing time sections and one statistical time-division multiplexing time section according to an embodiment of the present disclosure.

Referring to FIG. 6, further taking the synchronous time-division multiplexing time section Ttd divided into 3 synchronous time-division multiplexing time subsections Ttd1-Ttd3 as an example, As is head address, Atd1 is an address for storing working state parameters corresponding to the synchronous time-division multiplexing time subsection Ttd1, Atd2 is an address for storing working state parameters corresponding to the synchronous time-division multiplexing time subsection Ttd2, Atd3 is an address for storing working state parameters corresponding to the synchronous time-division multiplexing time subsection Ttd3, and Astd is an address for storing working state parameters corresponding to the statistical time-division multiplexing time section Tstd.

When controlling the state machine, the state machine controller obtains the head address As of the linked list of corresponding event cycle, and obtains the address, such as Atd1, of the next node according to the node (i.e. register) to which the head address As points. In one aspect, the state machine controller further obtains working parameters corresponding to the synchronous time-division multiplexing time subsection Ttd1 according to the node (i.e. register) to which the address Atd1 points, including count value of the counter corresponding to the time subsection Ttd1, name of the MAC protocol user working in time subsection Ttd1, and MAC protocol type and so on. In another aspect, the state machine controller obtains the address of the next node, such as Atd2, according to the node (i.e. register) to which the address Atd1 points, and switches to the address of the next node when the count value corresponding to the time subsection Ttd1 ends and hence enters into a working state corresponding to the next time subsection. Other circumstances are similar to the above circumstance, which will not be repeated here.

It is noted that the last address, such as Astd, to which the address pointer points, points to the next node address, i.e. the head address As. In addition, since STDM cannot definitely control the MAC protocol user in communication, working parameters of the node (i.e. register) to which the address Astd points does not include the information of the MAC protocol user adopting the STDM (such as name of the MAC protocol user working in time section Tstd, MAC protocol type and so on).

FIG. 5 and FIG. 6 described above are for the purpose of exemplary illustration. In actual application, for different time cycle, 1) the sequential order of the time section Ttd and the time section Tstd in a single time cycle can be determined according to actual situation, which is not limited here; 2) number and lengths of time subsections divided in the time section Ttd are determined according to actual situation, which is not limited here; 3) the protocol types of the MAC protocol user corresponding to the time subsections divided in the time section Ttd are determined according to actual situation, which is not limited here; 4) if the ratio K of the synchronous time-division multiplexing time section Ttd to the time cycle T is no less than 0 and less than 1, in the statistical time-division multiplexing time section Tstd, channel accessing states of the MAC protocol user adopting STDM is determined according to actual channel accessing situation of corresponding MAC protocol user.

Figures 7, 8:
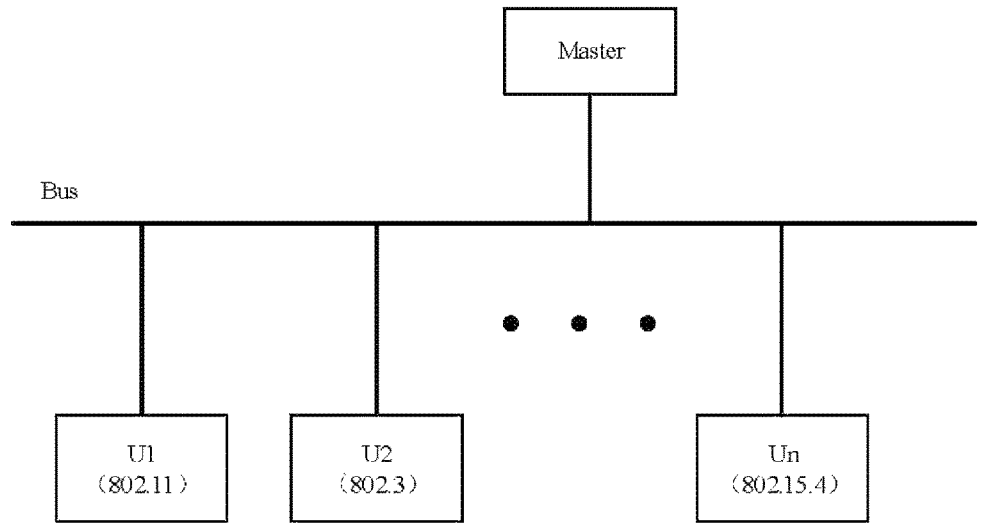
FIG. 7 is a schematic view showing a connection between MAC protocol users adopting statistical time-division multiplexing and a communication bus according to an embodiment of the present disclosure.
FIG. 8 is a schematic view showing a correspondence between different frequency ranges and synchronous time-division multiplexing time sections and/or the statistical time-division multiplexing time section according to an embodiment of the present disclosure.

Regarding the 4) point above, channel accessing mechanism for the MAC protocol user adopting STDM includes: collision avoidance and collision detection. Referring to FIG. 7, the master of the control center and a plurality of MAC protocol users U1-Un are connected to the communication bus, wherein n is an integer no less than 1. The users U1-Un adopt at least one MAC protocol, for example U1 adopts 802.11, U2 adopts 802.3 and Un adopts 802.15.4.

I, Collision Avoidance (Such as 802.11)

When the bus is idle, the counter for each protocol user generates a random number, and begins to subtract gradually until some user comes to 0 first, and the bus is detected again to determine whether it is still idle. If the bus is idle, the user with the counter first coming to 0 sends data. Accordingly, other protocol users can only receiving data at this time.

II, Collision Detection (Such as 802.3)

When the bus is idle, a plurality of protocol users send data via the bus. When a collision is detected (i.e. a plurality of protocol users send data via the bus at the same time), the random delay $T_{delay}$ is generated, and the counter begins to subtract gradually. When $T_{delay}$=0, the user sends data via the bus, that to say, the user with the shortest delay will first occupy the bus. When the bus is occupied by the user with the shortest delay, the master of the control center will broadcast to other users that the channel has been occupied and they only receive data.

In specific implementation, the information transmitting mode of the MAC protocol user adopting TDM or the MAC protocol user adopting the STDM is simplex, half duplex or duplex. If the information transmitting mode is half duplex, the MAC protocol user uses only one channel for both transmitting and receiving data. If the information transmitting mode is duplex, the MAC protocol user uses different channels for transmitting and receiving data.

In specific implementation, the synchronous time-division multiplexing time section Ttd and/or the statistical time-division multiplexing time section Tstd correspond to a plurality of channels with different frequency ranges. As shown in FIG. 8, furthering taking the synchronous time-division multiplexing time section Ttd divided into 3 synchronous time-division multiplexing time subsections Ttd1-Ttd3 as an example, X represents that the single time cycle T can be divided into time section Ttd1, Ttd2, Ttd3 and Tstd. These four time sections correspond to four different channels labeled as CH1, CH2, CH3 and CH4. Y represents that m different sub-channels with different frequencies f1-fm can be generated in a certain time section, wherein m is an integer greater than 1. In other words, the channel CH1 may include m parallel sub-channels CH11-CH1m, the channel CH2 may include m parallel sub-channels CH21-CH2m, the channel CH3 may include m parallel sub-channels CH31-CH3m, and the channel CH4 may include m parallel sub-channels CH41-CH4m. In specific implementation, the number of sub-channels included in each channel may be different. When generating working state table, the channels can been allocated to each user in terms of sub-channel according to user's communication requirements, for example the sub-channels CH11-CH1m and CH21-CH22 can be allocated to the user U1, and the sub-channels CH23-CH2m can be allocated to the user U2. In this case, the data transmitting rate can be improved and the utilization rate of the channel can also be improved.

In summary, in the technical solution of the present disclosure, the time cycle can be freely configured and the working state table corresponding to the length of the single time cycle for the HTDM can be formulated according to user's communication requirements. Further, ratios of the synchronous time-division multiplexing time section Ttd and the statistical time-division multiplexing time section Tstd in each time cycle can be freely configured according to the working state table to realize that the MAC protocol user adopting TDM can access the channel and transmit information in the synchronous time-division multiplexing time section Ttd, and/or the MAC protocol user adopting STDM can access the channel and transmit information in the statistical time-division multiplexing time section Tstd. The present disclosure effectively solves the technical problem in the prior art that the TDM and STDM are not compatible with each other in one wireless communication chip which hence cannot satisfy user's requirements on real-time communication and high channel utilization rate. The present disclosure realizes compatibility of the above two communication methods TDM and STDM on one wireless communication chip, and satisfies user's requirements on real-time communication and a high channel utilization rate.

In addition, according to communication requirements, the communication mechanism (specifically the time-division mechanism and frequency-division mechanism) of the sub-channels corresponding to any time subsection are configurable, and the channels can be allocated to the users in terms of sub-channel, so that the channel utilization rate is improved while user's requirement on information transmission is satisfied at the same time.

Although the present disclosure has been described with preferred embodiments, one of ordinary skill in the art may make modifications and amendments to these embodiments under the teaching of above creative concept. Accordingly, the appended claims are intended to be interpreted as including the above preferred embodiment and all the modifications and amendments that fall into the scope of the invention.

Obviously, various modifications and variations will become apparent to those skilled in the art to which the present invention pertains without departing from the spirit and scope of the disclosure. If these modifications and variants belong to the scope of the appended claims and its equivalent technical solutions, the present invention is intended to include these modifications and variants.

I claim:

1. A hybrid time-division multiplexing method, comprising:
   determining a length of a single time cycle according to preset communication requirements;
   formulating a working state table corresponding to the length of the single time cycle for the hybrid time-division multiplexing;
   dividing the single time cycle into a synchronous time-division multiplexing time section and/or a statistical time-division multiplexing time section based on the working state table; wherein the synchronous time-division multiplexing time section is allocated to a plurality of MAC protocol users adopting synchronous time-division multiplexing to access a channel, and the statistical time-division multiplexing time section is allocated to a MAC protocol user adopting statistical time-division multiplexing to access the channel; and a ratio of the synchronous time-division multiplexing time section to the single time cycle is no less than 0 and no greater than 1; and
   according to the working state table, accessing the channel and transmitting information by the plurality of MAC protocol users adopting synchronous time-division multiplexing in the synchronous time-division multiplexing time section, and/or accessing the channel and transmitting information by the MAC protocol user adopting statistical time-division multiplexing in the statistical time-division multiplexing time section;
   wherein if the ratio of the synchronous time-division multiplexing time section to the single tune cycle is greater than 0 and no greater than 1, the synchronous time-division multiplexing time section is divided into a plurality of synchronous time-division multiplexing time subsections based on the working state table to build a one-to-one correspondence between the plurality of MAC protocol users adopting synchronous time-division multiplexing and the plurality of synchronous time-division multiplexing time subsections, with each user accessing to the channel and transmitting information in its own time subsection;
   wherein a length of each synchronous time-division multiplexing time subsection is determined according to information quantity to be transmitted by the corresponding MAC protocol user;
   wherein the plurality of synchronous time-division multiplexing time subsections correspond one to one with a plurality of channels respectively, and
   wherein the plurality of MAC protocol users adopting synchronous time-division multiplexing include a predetermined number of MAC protocol users adopting synchronous time-division multiplexing, and wherein the working state table includes information of MAC protocol users adopting synchronous time-division multiplexing and the information includes the predetermined number of the MAC protocol users adopting synchronous time-division multiplexing, such that the division of the synchronous time-division multiplexing time section into the plurality of synchronous time-division multiplexing time subsections is performed according to the predetermined number of the MAC protocol users and the plurality of synchronous time-division multiplexing time subsections correspond, in number, to the predetermined number of the MAC protocol users included in the working state table.

2. The hybrid time-division multiplexing method according to claim 1, wherein a state machine model is used to switch among working states of the plurality of synchronous time-division multiplexing time subsections.

3. The hybrid time-division multiplexing method according to claim 1, wherein a state machine model is used to switch among working states of synchronous time-division multiplexing time sections and statistical time-division multiplexing time sections.

4. The hybrid time-division multiplexing method according to claim 1, further comprising:
   if the ratio of the synchronous time-division multiplexing time section to the single time cycle is no less than 0 and smaller than 1, a channel accessing state of a MAC protocol user is determined by an actual channel accessing situation of the user in the statistical time-division multiplexing time section.

5. The hybrid time-division multiplexing method according to claim 4, wherein a channel accessing mechanism of the MAC protocol user adopting the statistical time-division multiplexing comprises: collision avoidance and collision detection.

6. The hybrid time-division multiplexing method according to claim 1, wherein an information transmitting mode of the MAC protocol user adopting the synchronous time-division multiplexing or the statistical time-division multiplexing is simplex, half duplex or duplex.

7. The hybrid time-division multiplexing method according to claim 1, wherein the synchronous time-division multiplexing time section and/or the statistical time-division multiplexing time section correspond to a plurality of channels with different frequency ranges.

* * * * *